UNITED STATES PATENT OFFICE.

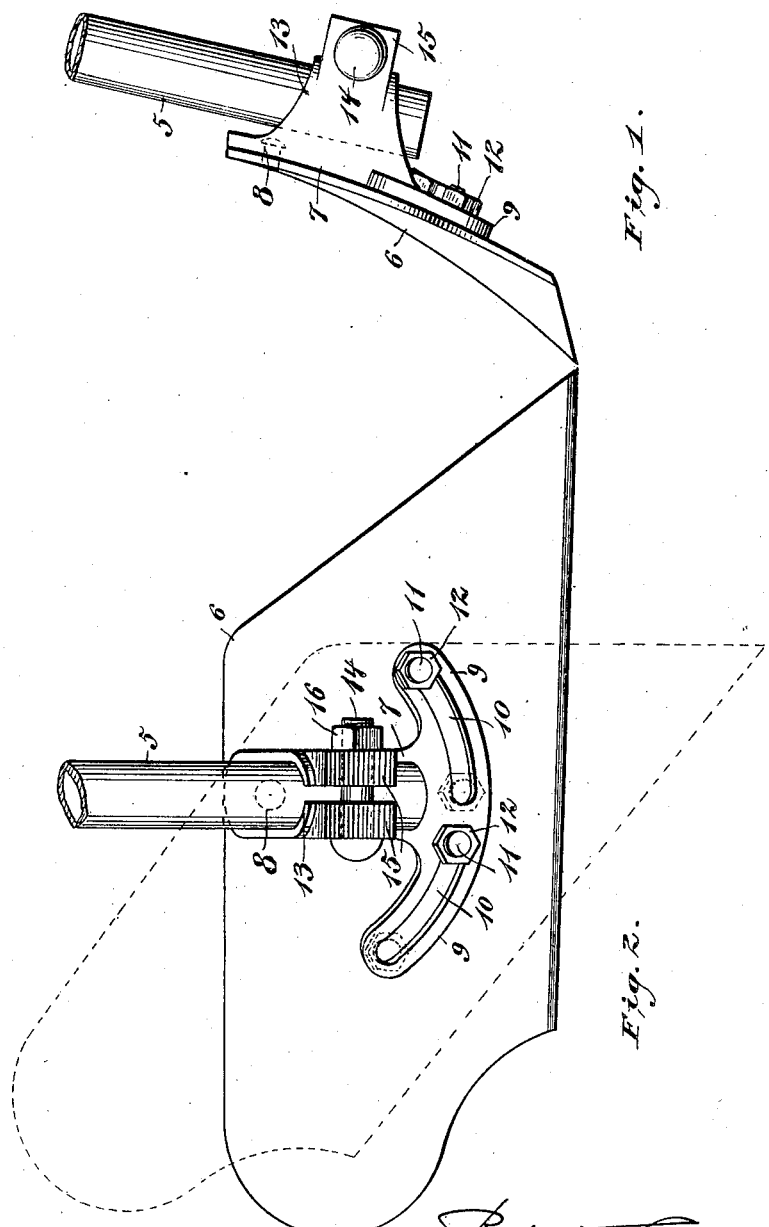

ROBERT L. MORRIS, OF KAHOKA, MISSOURI.

CULTIVATOR-SHOVEL FASTENING.

No. 888,635.  Specification of Letters Patent.  Patented May 26, 1908.

Application filed November 29, 1907. Serial No. 404,371.

*To all whom it may concern:*

Be it known that I, ROBERT L. MORRIS, a citizen of the United States, residing at Kahoka, in the county of Clark and State of Missouri, have invented certain new and useful Improvements in Cultivator-Shovel Fastenings, of which the following is a specification.

This invention relates to cultivators, and more particularly to the means for fastening the shovel or blade to the cultivator-standard, the object of the invention being to provide a fastening which permits the shovel to be set at different angles according to the nature of the work required and the condition of the ground and plants.

In the accompanying drawing, Figure 1 is a side elevation, and Fig. 2 is a rear elevation showing the application of the invention.

Referring specifically to the drawing, 5 denotes a cultivator-standard; and 6 is the shovel or blade carried thereby. On the back of the shovel is a plate 7, to the upper end of which in front of the cultivator-standard the shovel is pivotally connected by a bolt 8; and at the lower end of the plate are lateral extensions 9 in each of which are arc-shaped slots 10 to receive bolts 11 which are seated in the shovel. On the outside of the slots, the bolts are provided with fastening nuts 12.

Projecting rearwardly from the plate 7 is a split sleeve 13 which receives the standard 7 and is clamped thereto by a bolt 14 passing through alined openings in ears 15 projecting from the free ends of the sleeve-sections. This bolt is provided with a fastening nut 16.

The shovel 5 is securely fastened to the standard 6 by inserting the latter into the sleeve 13, and drawing the sleeve-sections together against the standard by means of the bolt 14 and the nut 16. Upon loosening the nuts 12 the shovel can be swung on the pivot 8 and thus set at different angles as shown by dotted lines in Fig. 2, and the shovel is securely held in adjusted position by tightening up the nuts 12.

The fastening means herein described enables the shovel to be readily put on or taken off the cultivator-standard, it will be securely held in place, and the desired adjustment can be easily made. The adjustability of the shovel adapts it more particularly for cleaning rows of corn and destroying weeds.

I claim:—

The combination with a cultivator shovel and its standard, of a plate formed with an integral clamp engageable with the standard, a pivotal connection between the plate and the shovel at one end of the former, oppositely projecting branches at the other end of the plate, said branches having arc-shaped slots which are concentric with the aforesaid pivot, bolts secured to the shovel and extending through the aforesaid slots, and fastening nuts for said bolts.

In testimony whereof I affix my signature, in presence of two witnesses.

ROBERT L. MORRIS.

Witnesses:
E. L. WEAVER,
I. H. CRAWFORD.